No. 748,110. PATENTED DEC. 29, 1903.
J. H. SEWELL.
INSECT DESTROYER.
APPLICATION FILED MAY 11, 1903.
NO MODEL.
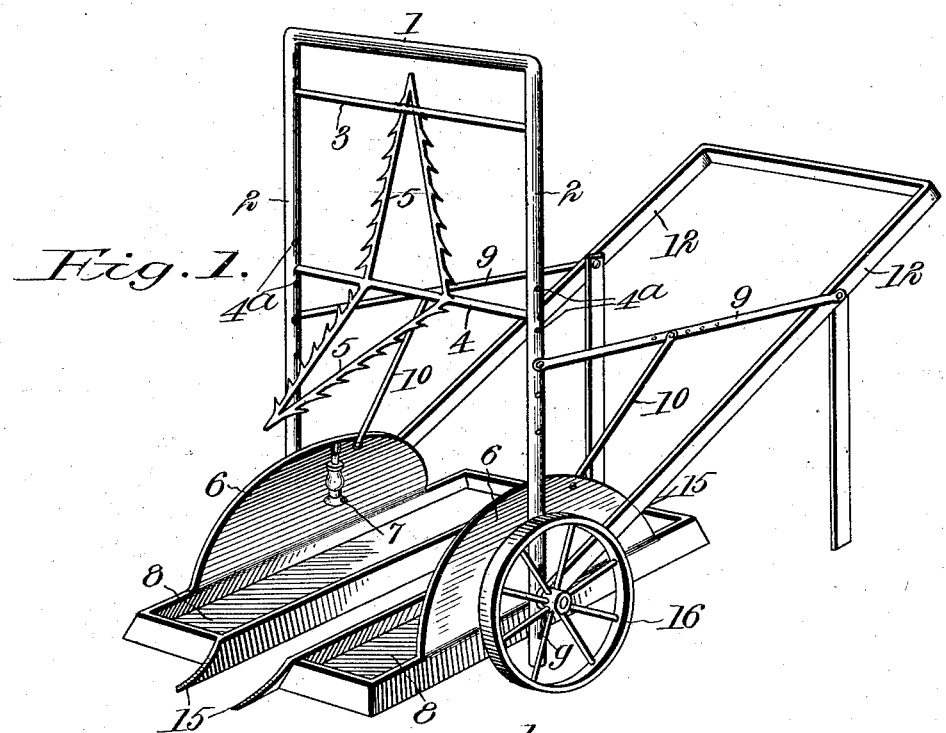
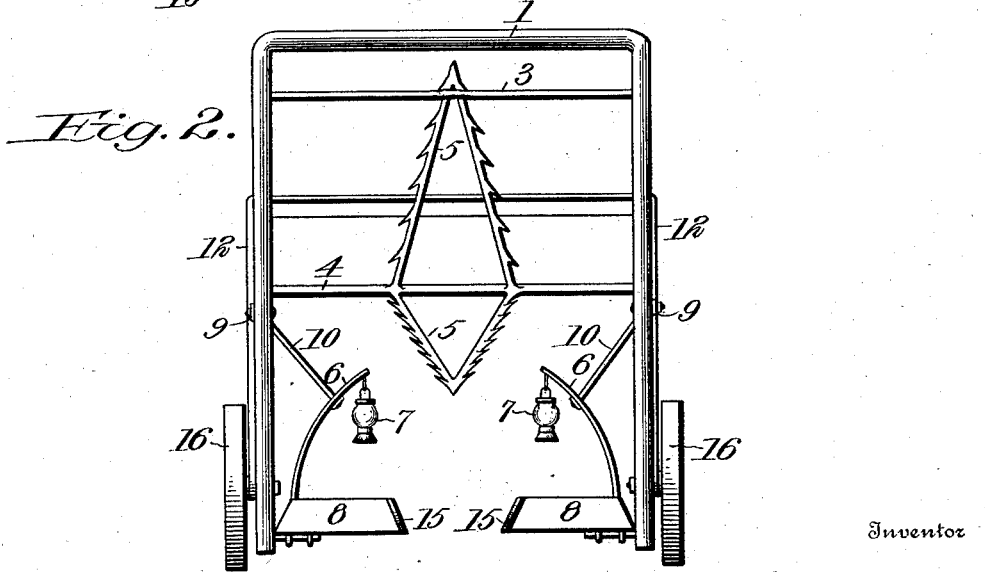
Witnesses
C. H. Walker
Geo. E. Few
Inventor
James H. Sewell
By Milo B. Stevens & Co.
Attorneys No. 748,110.　　　　　　　　　　　　　　　　　Patented December 29, 1903.

UNITED STATES PATENT OFFICE.

JAMES H. SEWELL, OF KOUNTZE, TEXAS.

INSECT-DESTROYER.

SPECIFICATION forming part of Letters Patent No. 748,110, dated December 29, 1903.

Application filed May 11, 1903. Serial No. 156,606. (No model.)

*To all whom it may concern:*

Be it known that I, JAMES H. SEWELL, a citizen of the United States, residing at Kountze, in the county of Hardin and State of Texas, have invented certain new and useful Improvements in Insect-Destroyers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates particularly to that class of insect-destroyers which contain pans of liquid into which the insects are shaken or enticed.

The object of the invention is to produce an improved device of the kind stated, as will more fully appear from the following description and claims.

The machine is particularly adapted for the destruction of the boll-weevil, which has proved so destructive to cotton-plants.

The apparatus includes two trays connected by a frame which straddles the row of plants, and in connection with the trays lanterns and reflectors are used to attract the insects.

In the accompanying drawings, Figure 1 is a perspective view of the machine, and Fig. 2 is a front elevation thereof.

Referring specifically to the drawings, the supporting-wheels for the machine are indicated at 16, and they turn on stub-axles projecting from the uprights 2. The pans 8, adapted to contain kerosene or other liquid suitable for killing the insects, are attached to and supported by the lower ends of the uprights. The wheels are vertically adjustable on the uprights, so that the pans may be run closer to or farther from the ground. The vertical adjustment is effected by fixing the axle in any one of a series of holes $g$ in the lower ends of the standards 2. The standards are connected at the top by cross-bar 1, forming a frame which straddles the row of plants and carries the pans along each side of the row. At the inner edge of both ends of the pans are lifters 15, which are properly shaped to run under the lower limbs of the plants and lift them above the pans. The machine may be run either forward or backward. Consequently there are lifters at both ends.

At 5 are indicated shakers which serve to run in through the plants and disturb the insects thereon. These shakers are set angularly on a rock-shaft 4, which extends horizontally across between the standards 2. The shaft is vertically adjustable on the standards in a series of bearing-holes $4^a$, whereby the shakers may be vertically adjusted to suit plants of various heights. The rock-shaft may be turned to cause the respective shakers to project according to the forward or backward movement of the machine. A stop-bar is indicated at 3, against which the shakers strike when they are reversed. When the machine is going forward, the front shaker is dropped, with the rear shaker in contact with the stop-bar, as shown in Fig. 1. When the machine is run backward, the rear shaker is dropped and the front shaker stops against the bar 3.

The handles are indicated at 12, pivotally joined to the axles and braced by rods 9 from the standards. Braces 10 extend from the rods to the pans to assist in supporting the latter.

At the outer edge of each pan and projecting upwardly therefrom is a concave reflector 6, from the upper edge of which hangs a lantern 7. The light of the lantern is reflected in the reflector and in the liquid and illuminates the same, so that the insects when disturbed by the shakers 5 fly at the reflector and into the liquid.

The machine is operated at night, as will be understood, and the construction specified provides an effective machine for ridding plants of insects.

What I claim as new, and desire to secure by Letters Patent, is—

1. In an insect-destroyer, the combination with pans having a plant-passage between, of reflectors projecting over the pans, and lanterns hanging between the reflectors and the passage, over the pans, substantially as described.

2. In an insect-destroyer, the combination with pans having a plant-passage between, and the reflectors and lanterns over the pans and beside the passage, of the shaker above the passage.

3. The combination with pans having a plant-passage therebetween, and reflectors and lanterns over the pans beside the passage, of the vertically-adjustable and reversible shakers above the passage.

In testimony whereof I affix my signature in presence of two witnesses.

J. H. SEWELL.

Witnesses:
S. H. SEWELL,
R. C. REED.